Mar. 3, 1925. 1,528,428

D. A. JOHNSON

LINE CLAMP

Filed March 12, 1923

Witnesses:

Inventor:
David A. Johnson
By Joshua R. H. Potts
His Attorney

Patented Mar. 3, 1925.

1,528,428

UNITED STATES PATENT OFFICE.

DAVID A. JOHNSON, OF CHICAGO, ILLINOIS.

LINE CLAMP.

Application filed March 12, 1923. Serial No. 624,429.

*To all whom it may concern:*

Be it known that I, DAVID A. JOHNSON, a citizen of the United States, and a resident of the city of Chicago, county of Cook, and State of Illinois, have invented certain new and useful Improvements in Line Clamps, of which the following is a specification.

My invention relates to improvements in line clamps and has for its object the provision of a simple and efficient construction of this character by means of which the ends of clothes lines and the like may be quickly and securely clamped and held in place.

Other objects will appear hereinafter.

The invention consists in the combinations and arrangements of parts hereinafter described and claimed.

The invention will be best understood by reference to the accompanying drawings forming a part of this specification, and in which, Fig. 1, is a side view of a line clamp embodying the invention and shown in position of use;

Figure 1:
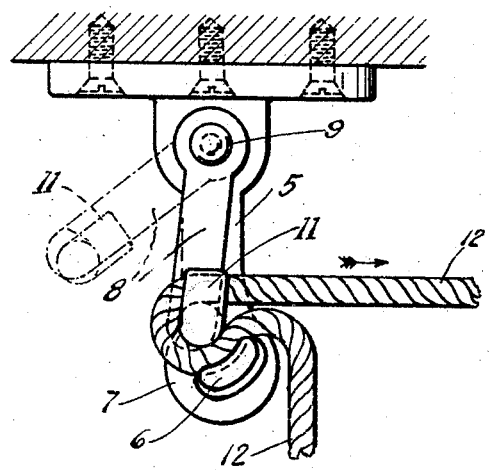
Figure 2:
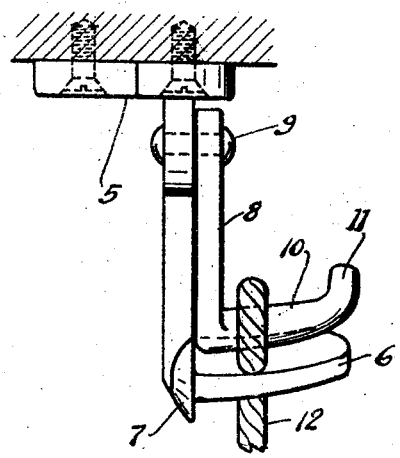
Fig. 2, is a view at right angles to Fig. 1.
Figure 3:
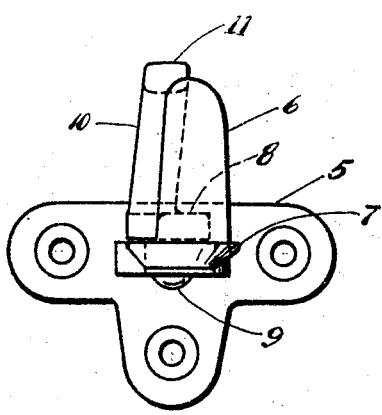
Fig. 3 is a bottom plan view corresponding with Fig. 1.

The preferred form of construction as illustrated in the drawings comprises a suitable bracket 5 adapted and arranged to be secured by screws to a horizontal or other surface. At its lower end the bracket 5 is provided with a laterally extending clamping abutment 6, a stop flange 7 being formed around the base of said abutment. The abutment 6 is slightly concave in cross section and positioned at an angle to the horizontal as shown in Fig. 1. The abutment 6 has also a slight upward inclination with reference to the body of the bracket 5 as shown. A substantially L-shaped clamping arm 8 is pivoted at 9 to the bracket 5 the lower portion 10 projecting substantially parallel to the abutment 6 and cooperating therewith to clamp a line between the two. The clamping portion 10 is given the same inclination as the abutment 6 and is provided with an upward hook projection 11 at its end.

In use the clamp is secured to any surface to which it is desired to secure a line such as a clothes line or the like. One method of securing the end of a line 12 in place is to pass the free end of the line over the clamping arm 10 and then between said arm and the abutment 6 as indicated in Fig. 1, drawing the line tight as desired. By this arrangement the tension in the line 12, acting in the direction of the arrow Fig. 1, will draw the clamping arm 10 toward the abutment 6 and thus clamp or pinch the end of the line to hold the same securely in place. The greater the tension on line 12, the more securely will the end thereof be clamped or held in place. It will be noted that when the tension in the line 12 is released, pinching or clamping action on the line will also be relieved so that there will be no undue wear on the line. This action is due to the fact that an abutment is used in conjunction with the clamping arm and the line passed around the clamping arm so that the tension in the line will draw the clamping arm toward the abutment.

Figure 4:
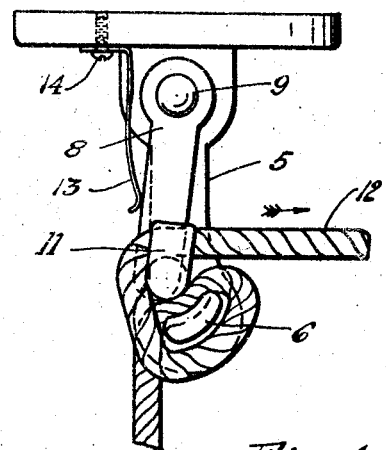
Fig. 4, is a view similar to Fig. 1, but showing a different method of securing the end of the line.

Another method of employing the clamp is illustrated in Fig. 4. Here the end of the line 12 is passed over the arm 10, under the abutment 6 and then between said arm and abutment as shown. By this arrangement a more direct and positive engagement between the line and the arm 10 is provided to insure against slippage. In either method of use the end of the line is securely clamped and held in place by the tension in the line itself.

The hook projection renders the device capable of use as an ordinary hook and the flange 7 prevents entanglement of the line with the bracket.

In Fig. 4 I have also illustrated a spring 13 secured to the bracket 5 by means of a screw 14, said spring resting against the side of arm 8 and serving to press the arm 10 toward the abutment 6. By such arrangement the constant clamping of the line end is insured even when the tension in the line is intermittently relieved, as for instance in a tow line for automobiles.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A line clamp comprising a vertical bracket provided with a clamping abutment projecting substantially horizontally therefrom; and a substantially L-shaped clamping member having one arm arranged vertically and pivoted on said bracket on an axis above and substantially parallel with said abutment, the lower arm of said clamping member co-operating with said abutment said clamping arm and abutment being arranged to permit the passage of the line around the same and between the said arm and said abutment, whereby the tension in the line is directly applied to said clamping arm in a direction substantially perpendicular to its pivot to draw the same against said abutment.

In testimony whereof I have signed my name to this specification in the presence of two subscribing witnesses.

DAVID A. JOHNSON.

Witnesses:
FREDA C. APPLETON,
JOSHUA R. H. POTTS.